United States Patent [19]

Rushbrooke et al.

[11] Patent Number: 5,682,411
[45] Date of Patent: Oct. 28, 1997

[54] IMAGING SYSTEM

[75] Inventors: John Rushbrooke, Cambridge; William Wray Neale, Great Wilbraham; Richard Eric Ansorge; Clare Elizabeth Hooper, both of Cambridge, all of United Kingdom

[73] Assignee: St. John Innovation Centre, England

[21] Appl. No.: 586,837

[22] PCT Filed: May 18, 1994

[86] PCT No.: PCT/GB94/01062

§ 371 Date: Dec. 15, 1995

§ 102(e) Date: Dec. 15, 1995

[87] PCT Pub. No.: WO94/30004

PCT Pub. Date: Dec. 22, 1994

[30] Foreign Application Priority Data

| | | | |
|---|---|---|---|
| Jun. 16, 1993 | [GB] | United Kingdom | 9312379 |
| Feb. 19, 1994 | [GB] | United Kingdom | 9403217 |
| Mar. 18, 1994 | [GB] | United Kingdom | 9405383 |

[51] Int. Cl.$^6$ .................................... H05G 1/64
[52] U.S. Cl. ............................. 378/98.3; 378/98.8
[58] Field of Search ......................... 378/4, 98.2, 98.3, 378/98.5, 98.6, 98.7, 98.8, 98.9, 62, 19, 901; 250/370.08, 370.09

[56] References Cited

U.S. PATENT DOCUMENTS

| | | | |
|---|---|---|---|
| 4,891,844 | 1/1990 | Kiri | 250/370.09 |
| 5,138,642 | 8/1992 | McCroskey et al. | 378/19 |
| 5,465,284 | 11/1995 | Karellas | 378/98.8 |

*Primary Examiner*—Don Wong
*Attorney, Agent, or Firm*—Lee, Mann, Smith, McWilliams, Sweeney & Ohlson

[57] ABSTRACT

An X-ray scanning system for high speed imaging of an object using an X-ray source for generating a fan shaped X-ray beam (12) for traversing a linear section or slice of the object, and a linear array of detectors (14) on the opposite side of the object (10) from the source which generate light depending on the X-ray image incident thereon, wherein optical fibers (16) link the detectors to the input of an image intensified CCD camera (18), the fiber ends forming a planar array having an aspect ratio which is different from that of the linear array of detectors and which matches the aspect ratio of the camera, the detector array having an addressable array of N×M pixels which during read-out are addressed in groups (superpixels) to enable a higher read-out speed to be obtained than if the pixels were read out individually, and each said superpixel having an aspect ratio of A to B (where A/B is greater than 1), the orientation of the superpixels being selected so as to produce a higher scanning resolution between regions of the CCD camera which correspond to signals from detectors which are widely spaced and lower scanning resolution in the perpendicular direction.

20 Claims, 4 Drawing Sheets

IMAGING SYSTEM

FIELD OF THE INVENTION

This invention concerns X-ray imaging systems, particularly systems for imaging large objects. By "large" is meant objects having an area which is much greater than the area of the radiation detector employed so that only a very small part of the overall article can be seen by the detector at any instant.

An imaging system is described in EP 0286393 devised by some of the present inventors in which an X-ray source irradiates an object and an elongate detecting means is located on the other side of the object operable to emit light in response to incident radiation after passing through the object, and an array of optical fibres is arranged so that for each fibre an input end thereof is positioned at the detecting means for receiving light therefrom and the output end thereof is positioned at a camera, such as an intensified charge coupled device (CCD), wherein the optical fibres are regrouped so that the aspect ratios of the input and output ends of the bundle of optical fibres match those of the detecting means and of the image intensifier or camera respectively.

An imaging system as described will be referred to as a system of the type described.

In a system as aforesaid high speed X-ray imaging with high sensitivity and good dynamic range is virtually impossible to achieve using conventional CCD read-out technology.

It is therefore an object of the present invention to provide a modified imaging system of the type described by which higher speed read-out is possible.

SUMMARY OF THE INVENTION

According to the present invention an X-ray scanning system for high speed imaging of an object comprises:

an X-ray source for generating a fan shaped X-ray beam for traversing a linear section or slice of the object, a linear array of detectors on the opposite side of the object from the source which generate light depending on the X-ray image incident thereon, at least one optical fibre linking each detector to the input of a camera such as an image intensified CCD camera, the fibre ends forming a planar array having an aspect ratio which is different from that of the linear array of detectors and which matches the aspect ratio of the camera, wherein the detector array has an addressable array of N×M pixels which during read out are addressed in groups (superpixels) to enable a higher read out speed to be obtained than if the pixels were read out individually, and wherein each said superpixel has an aspect ratio of A to B (where A/B is greater than 1), and the orientation of the superpixels is selected so as to produce a higher scanning resolution between regions of the camera ready which correspond to signals from detectors which are widely spaced in the original line detector and a lower scanning resolution in a direction generally perpendicular thereto.

Hereinafter it is assumed that the camera is a CCD camera preceded by an image intensifier.

Typically A may be equal to 8 and B have a value of 1.

The change of aspect ratio of detector to image intensifier input may for example be linear to square, linear to rectangular, linear to circular, or linear to oval.

High speed may also be achieved by building groups of pixels (superpixels) of appropriate dimensions and number into the CCD design at the initial manufacture stage, though such design and fabrication entails high cost. Such redesign may entail parallel read-out in which the imaging area is divided into a number (say 6) of contiguous subregions, which are fabricated on the chip to have their own independent read-out structures, with equivalent factor of increase in read-out rate. The image must then be electronically reassembled after read-out.

The higher resolution in the one direction enables buffer regions to be created between areas of interest in the CCD array.

If larger rectangular areas of silicon are used to define superpixels in a specially fabricated CCD array (instead of uniformly sized areas) the spacing perpendicular to the longer dimension of each pixel is important to prevent crosstalk and allow the advantage of the invention to be achieved.

Discrimination as between one material and another within or forming the object irradiated by the X-ray source can be achieved using the invention if the linear detector is in fact composed of two lines of crystals each of which is responsive to incident X-rays thereon to emit light therefrom wherein the two lines of crystals are spaced apart along the direction travelled by the x-rays and wherein the second crystal is rendered less sensitive to part of the X-ray energy spectrum so that the light from the crystals in one line relates to X-ray energy from the wide spectrum emitted by the source and the light from the other line of crystals relate to energy from only part of the said X-ray spectrum.

If the first line of crystals masks the second line of crystals so that X-rays impinging on the second line of crystals have to first pass through the first line of crystals, it will be seen that lower energy X-rays will tend not to reach the second line of crystals whereas higher energy X-rays will tend to pass through the first line of crystals substantially unimpeded and the light energy from the second line of crystals will therefore tend to relate only to higher energy X-ray content.

Because the ability to perform material discrimination will be degraded by any crosstalk between the first and second line of crystals it is necessary to separate the ends of the fibres corresponding to each line of crystals.

According to a preferred feature of the invention, the light incident on the CCD is gated out during those portions of each light integration period during which charge is transferred to a read-out device.

Where the CCD defines an array of pixels arranged as Y lines of X pixels in which light is incident on X by Y/2 of the array and the remaining X by Y/2 of the array is masked, read-out maybe achieved by transferring (typically line by line) the line of charge pattern from the first X by Y/2 of the array to the masked X by Y/2 of the array so that the charge pattern can then be read out whilst light again integrates over the first part of the array. Gating out of the light removes the light image from the charge coupled pixels during this transfer. If it is not so removed, each line in the original array will continue to integrate any light incident at all intermediate positions of ease "line" as it is shifted through the array and before it is transferred into the masked portion of the array.

Appropriate gating can also be used to reduce the effect of afterglow from the detector elements where these are crystals whose afterglow time period is comparable to the integration time period of the CCD.

Image intensifier phosphors can also produce afterglow. It is therefore preferred that short decay time constant phosphors should be chosen. A phosphor P46 as defined in the Electronic Industries Association Publication No. 16 1960 in the article entitled Optical Characteristics of Cathode Ray Screens has been found to be suitable for 1 mm resolution at one meter per second scan rates using 1 kHz scanning of a CCD array (ie a one millisecond frame rate charge coupled device read-out).

Since high speed read-out is desired it is of course essential that the image intensifier phosphors also have fast rise time—at least as fast as the preferred decay period.

The gating of the light supplied to the CCD array may be achieved either by pulsing the x-ray source; gating the X-ray path between the source and the object or between the object and the detector; gating the detector; gating the light output between the detector and the image intensifier; gating the image intensifier itself (for example controlling a grid of the intensifier) or gating by the interposition of a shutter or other mechanism between the image intensifier and the CCD.

Alternatively an interline CCD may be used or a CCD having shielded pixel structure to enable storage of information with only one line shift.

A mechanical or liquid crystal shutter means may be located between the image intensifier and the CCD.

The arrangement of pixels within a superpixel of the CCD enables a system to be designed in which charge arising from light emanating from crystals in one part of the detector cannot affect regions of charge attributable to light emitted by crystals in another part of the detector. It is this feature which maintains and improves the signal to noise ratio in the output signal and enables a high sensitivity and high dynamic range to be achieved even with low X-ray dose levels.

It will be seen that this is of particular importance where material discrimination is to be performed.

Where simple imaging is all that is required, and there is no requirement to discriminate between materials according to atomic number, a simple linear array detector comprising a long line of crystals may be employed, but it is still advantageous for the superpixel aspect ratio to be maintained to maintain imaging resolution.

Thus it is very important to avoid any arrangement in which non-adjacent crystals in the linear array are mapped into proximate positions in the intensified CCD camera.

Where material discrimination is required and two lines of detector crystals are employed, the first crystal is preferably designed and/or selected to absorb lower energy X-rays and to pass high energy spectrum X-rays so that the second crystal is essentially only responsive to the latter.

In such an arrangement a particularly compact construction can be obtained if the crystals are laterally linked to optical fibres for conveying light therefrom.

According to a further aspect of the invention, two X-ray sources may be provided, one of high energy and the other of low energy separated along the line of movement of the object and two detectors are provided opposite each of the sources, each detector comprising a single line of crystal detectors. The subsequent optical processing using optical fibres and image intensified CCD camera, is similar to that envisaged above, and by maintaining constant linear motion of the object and a fixed separation between sources and detectors, so the signals from each slice through the object can be correlated and compared to determine the ratio of high to low energy X-rays for material discrimination purposes.

A demagnifying image intensifier and/or demagnifying fibre optic tapers may be employed to match a large input area of fibre ends to the CCD.

Afterglow of the crystals following exposure to X-rays may be mitigated by using optical filters between the crystals and the detectors and photocathode of the image intensifier, for example a blue-green filter may be employed.

DESCRIPTION OF EMBODIMENT

An imaging system in accordance with the invention is now described by way of example with reference to the accompanying drawings, in which.

Figure 1:
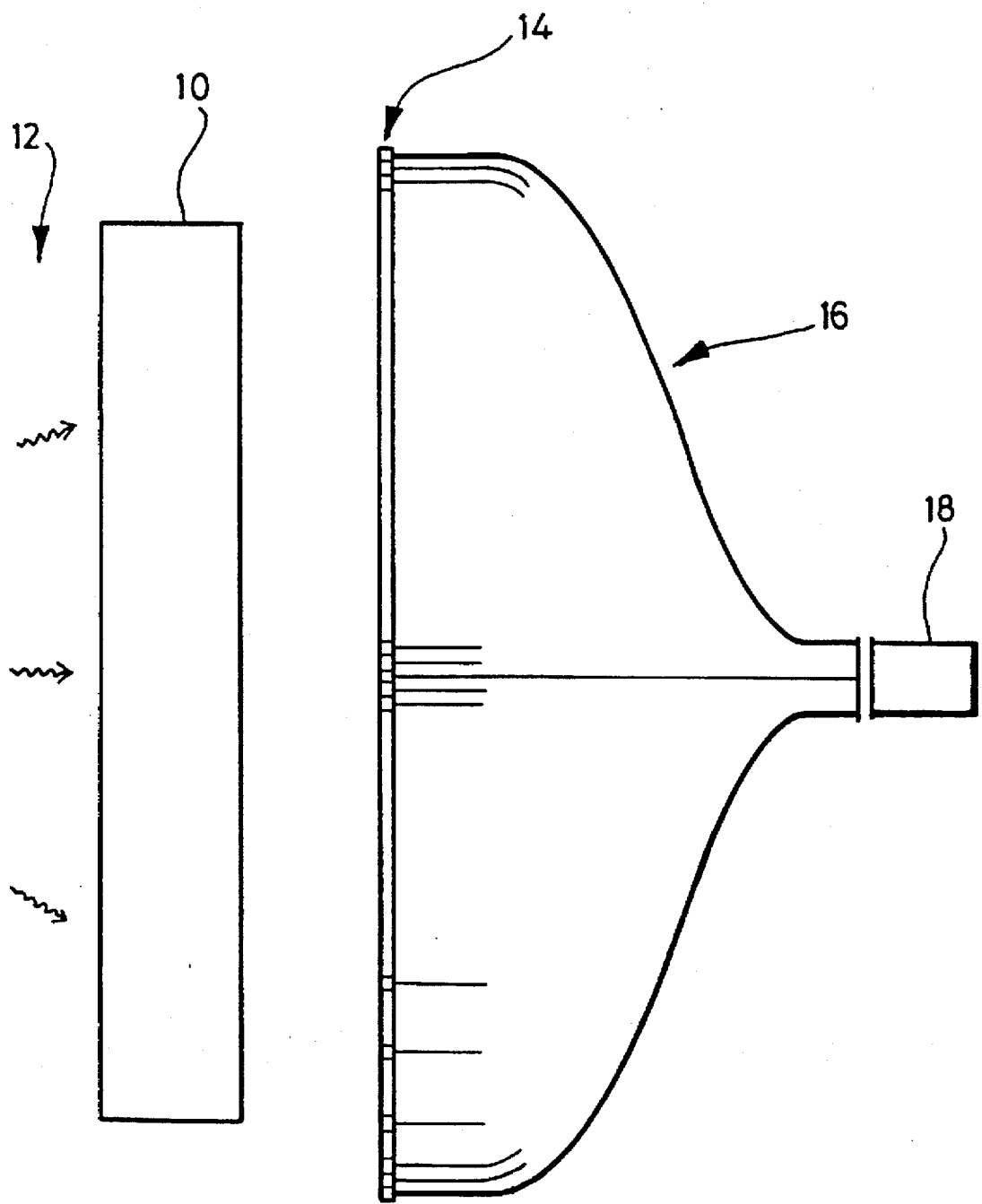
FIG. 1 is a diagrammatic side view of the overall system.

The system shown in FIG. 1 comprises the object 10 to be imaged, on which object is incident a fan-shaped beam 12 of X-rays. The object is normally traversed in a plane normal to the plane of the fan-shaped X-ray beam 12, ie in a direction normal to the plane of the drawing.

X-rays passing through the object are incident on a line of crystal detectors 14, from which optical fibres 16 extend to specific regions on the face of an image-intensified CCD camera 18, with an appropriate change in aspect ratio, for example linear to rectangular.

The detector defines specific groups of superpixels constituted by arrays, typically linear arrays, of a plurality of pixels, and the groups of crystals defining these superpixels are addressed as groups to enable high speed read-out. A higher scanning resolution is thus obtained between regions of the CCD array which correspond to signals from detectors widely spread in the line of detectors than the scanning ratio in the perpendicular direction.

Thus, for CCD viewing, the output of the image intensifier (which may be multistage) uses means whereby CCD pixels are read out in groups so as to achieve high read-out rate and hence imaging speed, wherein a group has an aspect ratio chosen so that any cross-talk between fibre ends is confined to that between fibre ends corresponding to the nearest neighbours on the linear detector array.

Figure 2:
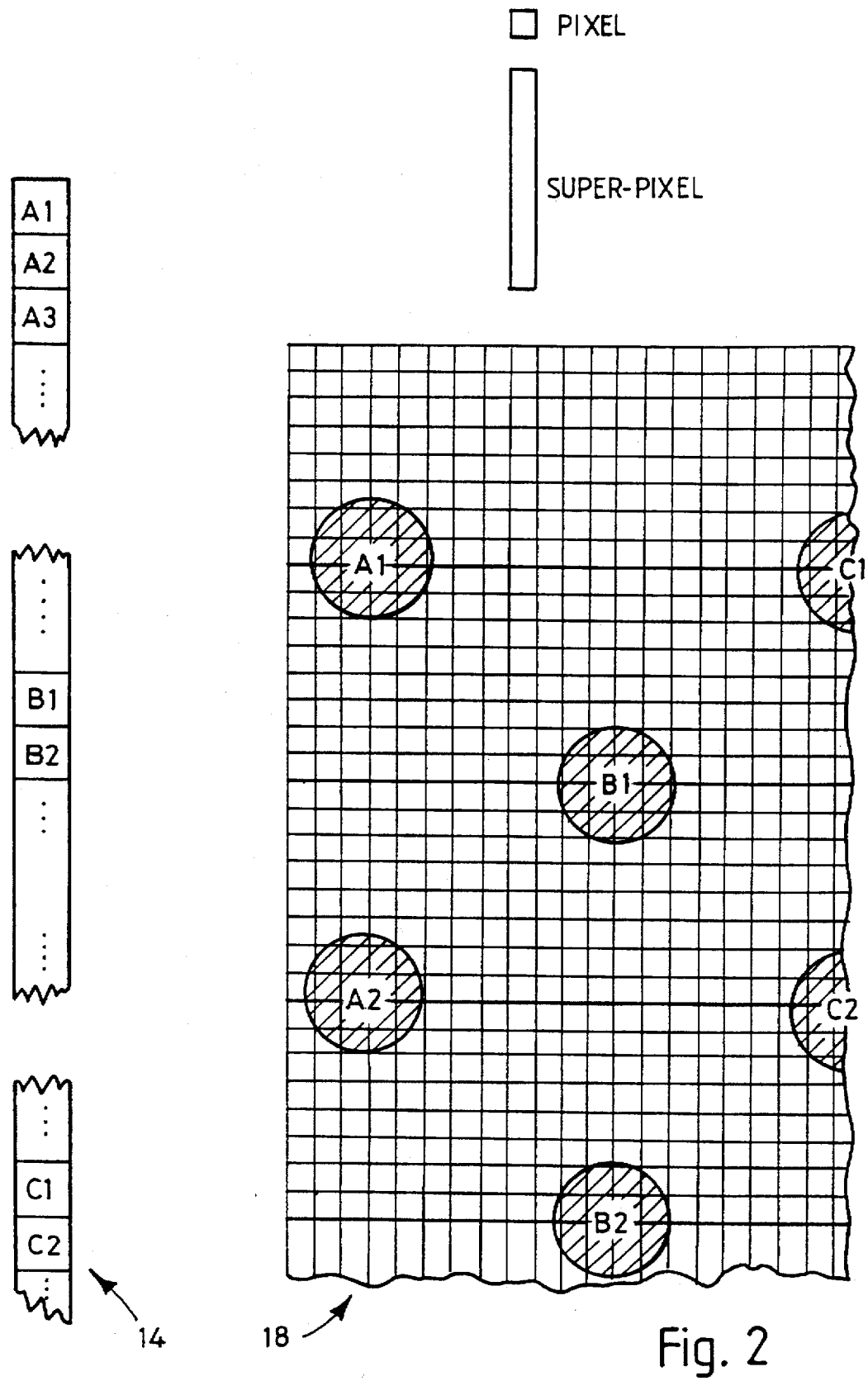
FIG. 2 shows a pixel/fibre matching arrangement.

An example having aspect ratio 8 to 1 is shown in FIG. 2, wherein also a columnar gap of width at least three superpixels is deliberately inserted between the columns of fibre ends to climate cross-talk between non-neighbouring detector elements, and a single fibre end is typically viewed by twelve superpixels. In FIG. 2, the arrays of detector crystals are referenced A1, A2, A3 . . . , B1, B2 . . . , C1, C2 . . . , etc, whilst at the CCD, the pixel arrangements of the circular fibre ends are referenced correspondingly.

Discrimination as between one material and another within or forming the object irradiated by the X-ray source can be achieved using the invention if the linear detector is in fact composed of two lines of crystals each of which is responsive to incident X-rays thereon to emit light therefrom, wherein the two lines of crystals are spaced apart along the direction travelled by the X-rays and wherein the second crystal is rendered less sensitive to part of the X-ray energy spectrum, so that light from the crystals in one line relates to X-ray energy from the wide spectrum emitted by the source and the light from the other line of crystals relates to energy from only part of the X-ray spectrum.

If the first line of crystals masks the second line of crystals so that X-rays impinging on the second line of crystals have to pass through the first line of crystals, it will be seen that lower energy X-rays will tend not to reach the second line of crystals, whereas higher energy X-rays will tend to pass through the first line of crystals substantially unimpeded, and the light energy from the second line of crystals will therefore tend to relate only to higher energy X-ray content.

Figure 3:
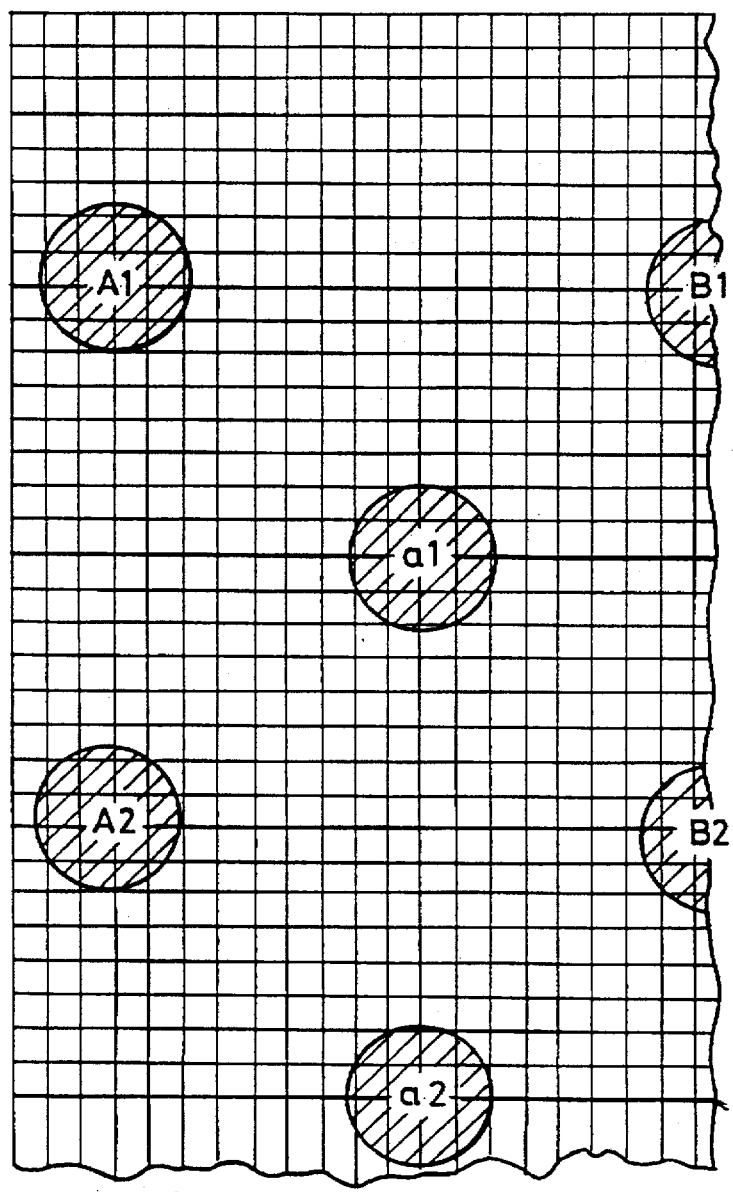
FIG. 3 shows a modified pixel/fibre mapping arrangement.
Figure 3:
Figure 3:
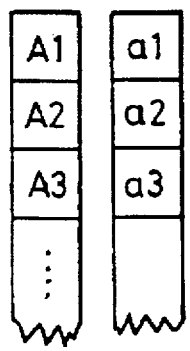
Figure 3:
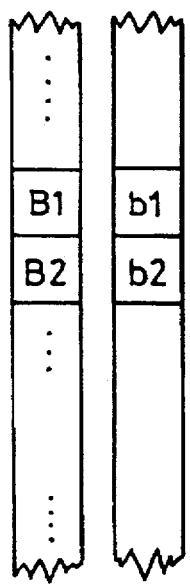
Figure 3:
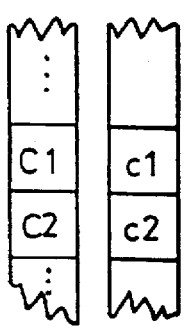

Because the ability to perform material discrimination will be degraded by any cross-talk between the first line and second line of crystals, it is necessary to separate the fibre ends corresponding to each line of crystals, as shown in FIG. 3, wherein references analogous to those of FIG. 2 are employed.

As above described, increasing the read-out speed is achieved by reading CCD pixels out in groups, or superpixels. High speed may also be achieved by building superpixels of appropriate dimensions and number into the CCD design ab initio, though such design and fabrication entails high cost. Such redesign may also entail parallel read-out, in which the imaging area is divided into a number (say 6) of contiguous subregions, which are fabricated on the chip to have their own independent read-out structures, with equivalent factor of increase in read-out rate. The image must then be electronically reassembled after read-out.

Figure 4:
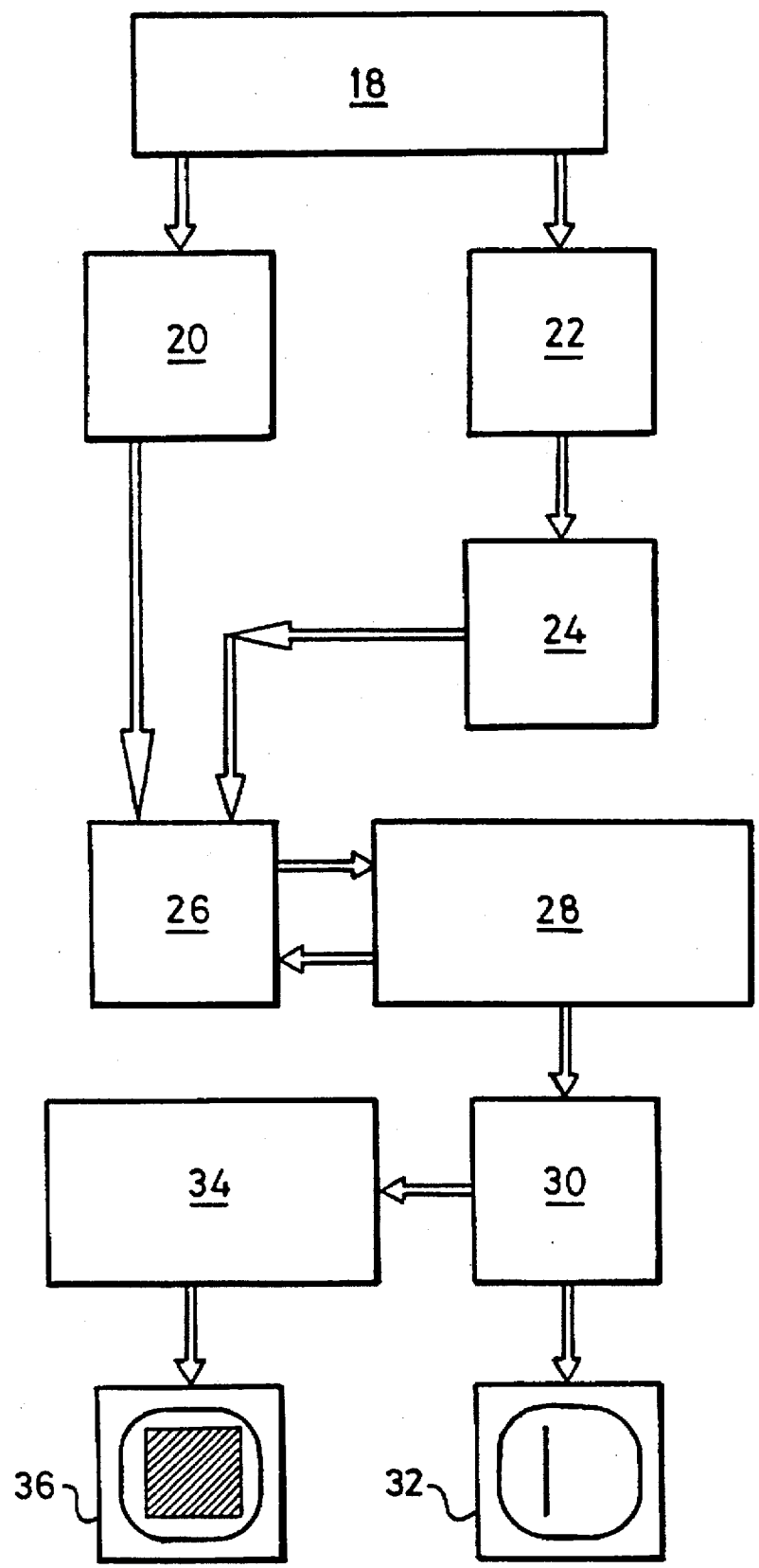
FIG. 4 is a block diagram of the electronic processing circuitry.

Also as hitherto described, FIGS. 2 and 3 indicate how the light from each fibre appearing at the input of the CCD gives rise to a distribution of charge in the superpixel structure of the CCD. In the figures approximately 12 superpixels each receive part of the charge corresponding to a given fibre. However, a "mapping" procedure must then be incorporated in electronic hardware and software to associate superpixels with fibres, and to add the total charge from the superpixels belonging to a given fibre. Circuitry for this purpose is shown in FIG. 4.

In FIG. 4, the CCD camera is again referenced 18. Outputs pass to a flash analogue to digital converter(FADC) 20 and to a clocked pixel counter 22, and from the latter to a look-up table 24. An adder 26 sums the FADC value to the total for specific optical fibres, as obtained from the look-up table. Adder 26 also exchanges information with a memory 28 which provide information to enable the sums of the FADC values for each group pixels (viewing each fibre end) to be accounted for.

Adder 30 sums the fibre values at the end of each CCD frame and provides an output to a real-time image display 32.

Additional algorithms may be incorporated in circuitry 34 to enhance contrast, identify materials, etc and provide an output to an off-line image display 36.

We claim:

1. An X-ray scanning system for high speed imaging of an object comprising
    an X-ray source for generating a fan shaped planar X-ray beam for traversing a linear section or slice of said object;
    a linear array of detectors on the opposite side of the object from and coplanar with said beam which generate light depending on the X-ray image incident thereon;
    a CCD camera containing an N by M array of photosensitive pixels supplied with light from said detectors;
    at least one optical fibre linking each detector to the input of said CCD camera, the fibre ends remote from said detectors being arranged in a generally rectangular planar area for imaging light from said detectors onto different regions of said N by M array of pixels, the proportions of the fibre array corresponding to the proportions of said N by M array of CCD pixels;
    said N by M pixels being grouped to form superpixels;
    said superpixels being addressed to enable a higher read out speed than if the pixels were read out individually;
    each said superpixel being rectangular and having a length A and a width B, A/B being greater than 1; and
    the orientation of said superpixels relative to the positions of said fibres in said planar array being selected so that light images from adjacent detectors in the linear array and incident on the CCD are separated by a smaller number of superpixels than are light images from well separated detectors in the linear array, thereby to reduce cross talk between the signals derived from said detectors which are widely separated in the linear array.

2. A system according to claim 1, having a demagnifying image intensifier and/or demagnifying fibre optic tapers to match a large input area of fibre ends to the CCD camera.

3. A system according to claim 1, wherein the ratio A/B is 8:1.

4. A system according to claim 1 or claim 3, wherein the change of aspect ratio of detector array to camera input is linear to square, or linear to rectangular, or linear to circular, or linear to oval.

5. The system according to claim 1 wherein the CCD camera is image intensified.

6. A system according to claim 5, wherein afterglow of detector crystals following exposure to X-rays is mitigated by optical filters positioned between the crystals and the detectors and photocathode of the image intensifier.

7. A system according to claim 5, wherein groups of pixels (superpixels) of appropriate dimensions and number are incorporated into the CCD camera at manufacture.

8. A system according to claim 7, employing parallel read-out in which the imaging area is divided into a number of contiguous subregions, which are fabricated on the CCD chip with independent read-out structures, the image being electronically reassembled after read-out.

9. A system according to claim 8, wherein buffer regions are created between areas of interest in the imaging area.

10. A system according to claim 1, having two X-ray sources, one of high energy and the other of low energy separated along the line of movement of the object, and two detectors respectively opposite each of the sources, each detector comprising a single line of crystal detectors, wherein during optical processing a constant linear motion of the object is maintained and also a fixed separation between sources and detectors, whereby the signals from each slice through the object can be correlated and compared to determine the ratio of high to low energy X-rays for material discrimination purposes.

11. A system according to claim 1, in which the light incident on the CCD camera is gated out during those portions of each light integration period during which charge is transferred to a read-out means.

12. A system according to claim 11, wherein the CCD camera defines an array of pixels arranged as Y lines of X pixels in which light is incident on X by Y/2 of the array and the remaining X by Y/2 of the array is masked, read-out being achieved by transferring the line of charge pattern from the first X by Y/2 of the array to the masked X by Y/2 of the array so that the charge pattern can then be read out whilst light again integrates over the first part of the array, gating out of the light removing the light image from the charge coupled pixels during this transfer.

13. A system according to claim 12, in which charge pattern transfer is carried out line by line.

14. A system according to claim 11, wherein gating is also used to reduce the effect of afterglow from the detector elements constituted by crystals having an afterglow time period comparable to the integration time period of the CCD camera.

15. A system according to claim 11, wherein gating of the light supplied to the CCD camera is achieved by pulsing the X-ray source, or by gating the X-ray path between the source and the object or between the object and the detector, or by gating the detector, or by gating the light output between the detector and the image intensifier, or by gating the image intensifier, or by the interposition of a shutter between the image intensifier and the CCD.

16. A system according to any of claims 11 to 14, employing an interline CCD or a CCD having a shielded pixel structure to enable storage of information with only one line shift.

17. A system according to claim 1, wherein the detector array comprises a line of crystals laterally linked to optical fibres for conveying light therefrom.

18. A system according to claim 1, wherein the linear detector array comprises two lines of crystals each of which is responsive to incident X-rays thereon to emit light therefrom, the two lines of crystals being spaced apart along the direction travelled by the X-rays and wherein the second line of crystals is rendered less sensitive to part of the X-ray energy spectrum so that the light from the crystals in one line relates to X-ray energy from the wide spectrum emitted by the source and the light from the other line of crystals relates to energy from only part of the said X-ray spectrum.

19. A system according to claim 18, wherein the first line of crystals masks the second line of crystals such that X-rays impinging on the second line of crystals have to first pass through the first line of crystals.

20. A system according to claim 18, wherein crosstalk between the first and second line of crystals is avoided by separating the ends of the fibres corresponding to each line of crystals.

* * * * *